Sept. 30, 1958         H. TEEGEN         2,853,989
INTERNAL COMBUSTION ENGINE
Filed Oct. 7, 1955         3 Sheets-Sheet 1
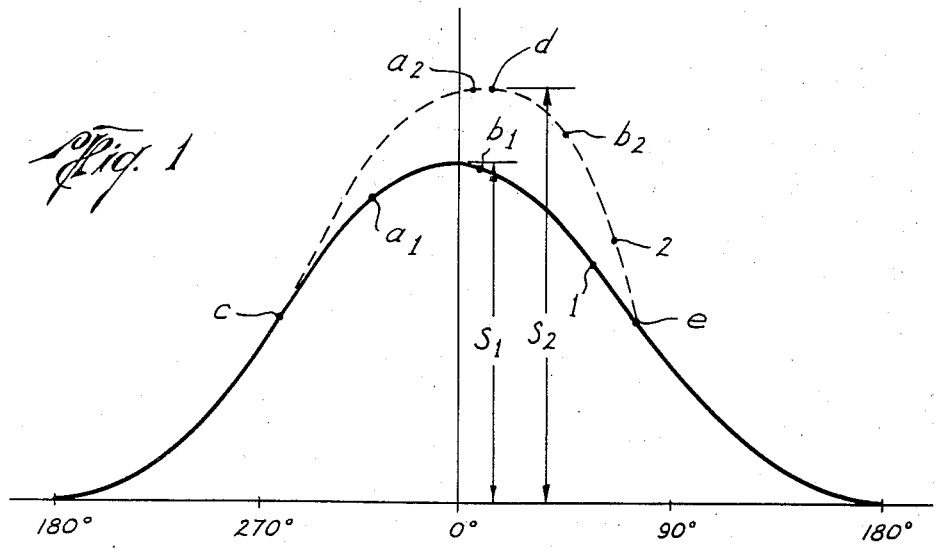
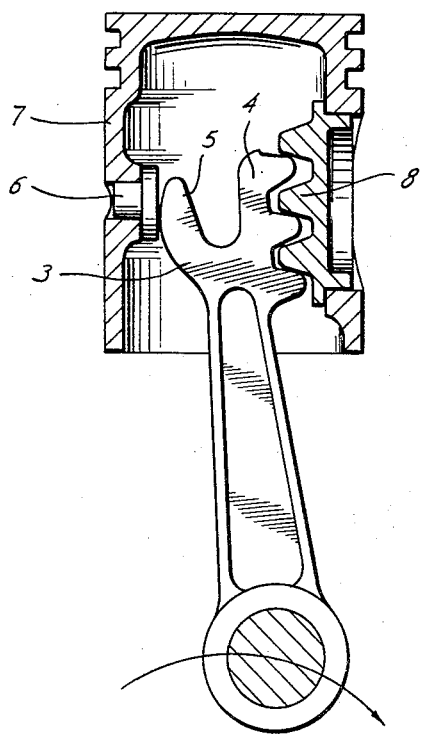
Hermann Teegen
INVENTOR.
BY J. Vincent Martin
Joe E. Edwards
B. R. Pravel
ATTORNEYS

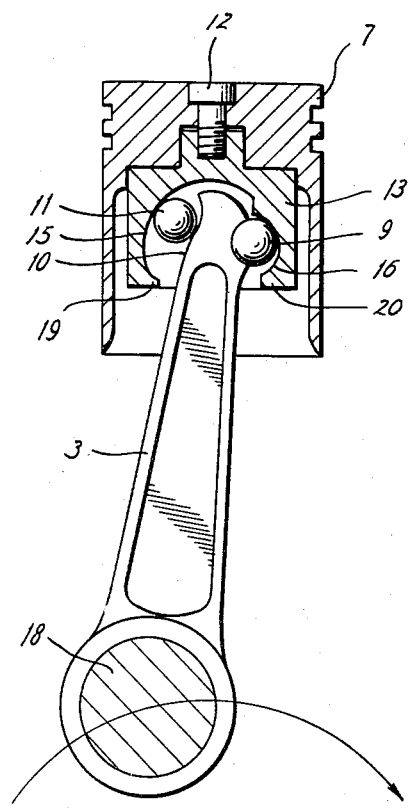
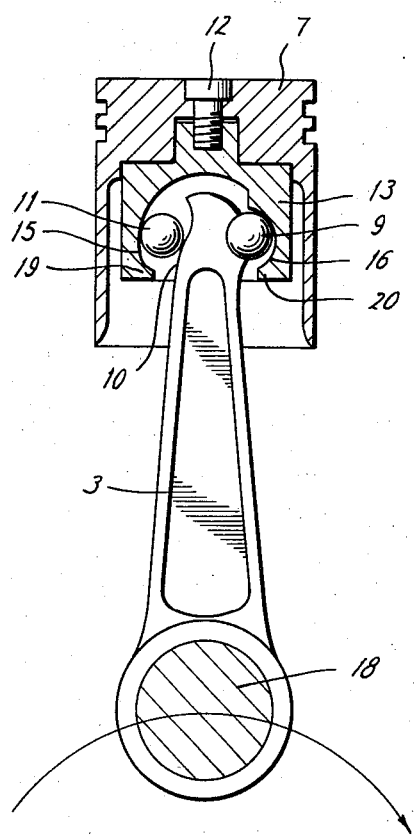

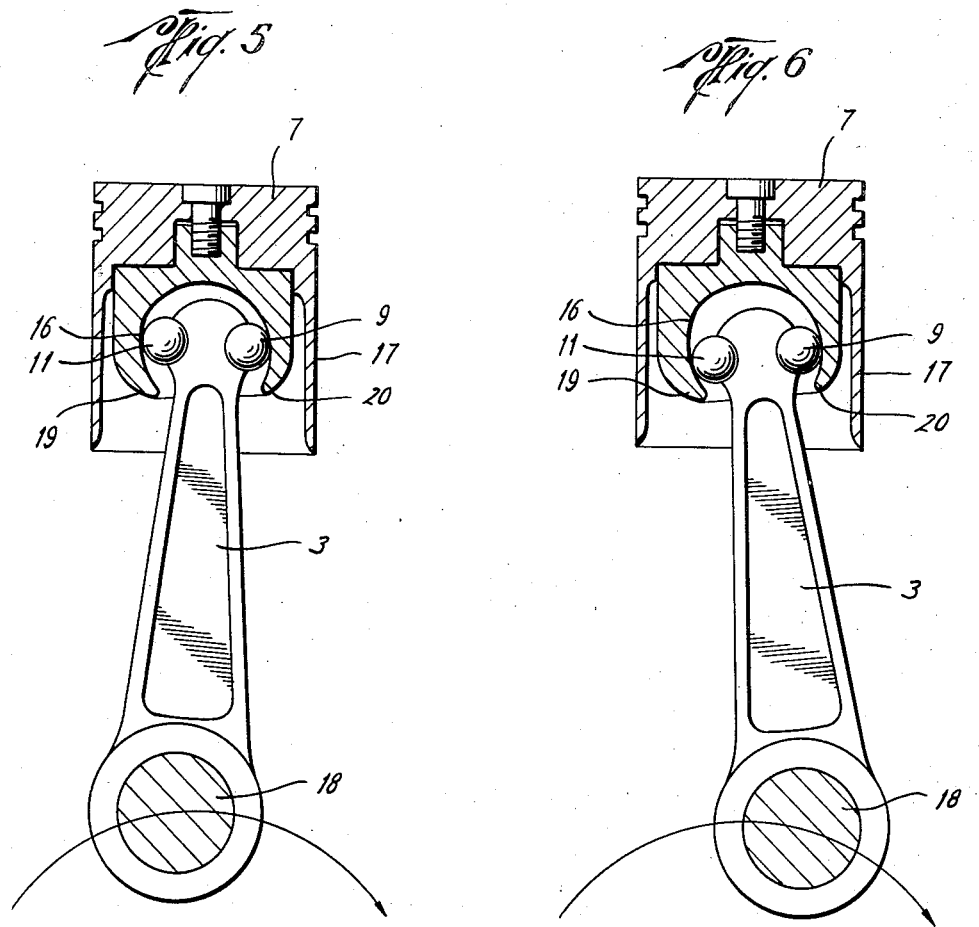

United States Patent Office 2,853,989
Patented Sept. 30, 1958

2,853,989
INTERNAL COMBUSTION ENGINE

Hermann Teegen, Bielefeld, Westfalia, Germany, assignor, by mesne assignments, to Mission Manufacturing Company, Houston, Tex., a corporation of Texas Application October 7, 1955, Serial No. 539,171

Claims priority, application Germany October 20, 1954

5 Claims. (Cl. 123—197)

The invention relates to an internal combustion engine. In internal combustion engines of the self-ignition type which compress an air-fuel mixture, ignition of the air-fuel mixture which has been prepared outside the combustion chamber, depends upon temperature and pressure of the compressed mixture as well as other factors. Whilst in Otto or diesel engines the ignition time is determined by the moment of interruption on the contact breaker or, respectively, by the injection begin, on engines of the self-ignition type compressing an air-fuel mixture special means have to be provided to achieve ignition and thus maximum combustion pressure at a moment which is the most favorable one for the operation of the internal combustion engine with respect to the existing operating conditions. So far, in internal combustion engines of the above type means have been provided which allow for a variation of the compression ratio during the operation of the engine. For this purpose, adjustable opposed pistons or displaceable cylinder sleeves which are closed at their top end have been employed, said means being manually or automatically controlled dependent on the temperature of the combustion chamber or its surrounding parts, or eventually, eccentrically journalled crank shafts have been used which have adjustable eccentrics.

The invention relates to an internal combustion engine of the self-ignition type, compressing an air-fuel mixture, in which engine the ignition time is set so that the point of maximum combustion pressure in any case is beyond the point of the crank circle at which the connecting rod and the crank web form a straight line. According to the invention means have been provided which impart an additional stroke to the piston in its top dead center.

This object can be achieved in different ways. The upper end of the connecting rod, for instance, may be provided with teeth on one side which are engaged by corresponding teeth provided on the piston. When tilting the connecting rod the piston, through means of these teeth, is further displaced in the direction of the cylinder axis, whereby the piston through means of a slide is supported on a correspondingly shaped lug of the connecting rod on the side opposite the teeth.

In another embodiment the upper connecting rod end is provided with sliding surfaces or rollers which roll or slide on corresponding curved pieces inside the piston or on the connecting rod end itself when tilting the connecting rod. The curved sectors are formed so that the desired additional axial piston stroke is achieved. The upper connecting rod end, for instance, may have a rotatably arranged roller which is supported on a curved surface arranged inside the piston, whilst on the other side a further roller moves between a curved plane provided on the upper connecting rod end and another curved surface arranged inside the piston. In a modified version the upper connecting rod end may have rotatable rollers on both sides which roll on correspondingly shaped curved surfaces. These curved surfaces comprise several sections of different curvature.

In the drawings—

Fig. 1 is a diagram of the piston movements, the piston stroke being plotted against the crank angles, Fig. 2 is a sectional view through a connecting rod arrangement with a toothing, Fig. 3 is an arrangement with a fixedly arranged and a movable roller, the crank pin being in a position before zero, Fig. 4 shows the same arrangement, the piston being in zero position, Fig. 5 is an arrangement comprising two fixedly journalled rollers in the connecting rod end, the crank pin being before zero position, and Fig. 6 shows the same arrangement, the crank pin being beyond zero position.

The curve 1 of Fig. 1, by way of example, shows a diagram of the piston movements in a conventional drive mechanism. The abscissa illustrates the crank angles on the crank circle, the ordinate the stroke of the piston. The piston starts its movement in the bottom dead center (180°) and arrives at its maximum top position in the upper dead center (0°) at a speed=0, whereby it travels the distance $S_1$, to reach its initial position again in the bottom dead center (180°). Shortly before reaching the upper dead center (0°), at a point $a_1$, ignition shall take place, and at a point $b_1$ maximum combustion pressure shall be reached.

The curve 2 shows the piston travel in one of the arrangements in accordance with this invention. From its bottom dead center (180°) up to a point C the piston follows the same or almost the same movements as in a conventional engine. From a point C the piston is additionally moved so that at a point $d$, which is a certain distance beyond the position 0°, the piston has traveled most of its way $S_2$, its speed being zero at this point. The piston, which is now accelerated, then moves towards the bottom dead center (180°), whereby it follows the same or almost the same movements as in a conventional engine. The compression ratio, through correct dimensioning of the combustion chamber, can be selected so that ignition takes place at a point $a_2$ and maximum combustion pressure is reached at a point $b_2$, which is a considerable distance beyond zero position of the crank circle (0°).

During its stroke from the bottom dead center to the top dead center the piston at first follows a movement which completely corresponds to the laws of motion in conventional engines as used hitherto.

At a certain angular position before zero position of the crank circle the tilting movement of the connecting rod inside the piston effects an additional stroke of the piston in the direction towards the cylinder head. The piston, which until the beginning of the additional movement at the end of the stroke performs a retarded motion, is now accelerated again and travels a certain distance beyond the stroke determined by the crank radius, so that the top dead center of the piston bottom is beyond zero position of the crank radius. This additional piston stroke has the following effect: The air-fuel mixture entering the cylinder is compressed to a degree which for the present does not cause ignition even under most favorable ignition conditions.

The additional stroke of the piston which follows now further increases compression. Maximum compression is reached only after zero position of the crank circle. The size of the combustion chamber can be easily determined to achieve ignition at or shortly before this point. In this piston position the crank pin, for a certain angle, is already beyond the zero position of the crank circle so that when reaching maximum combustion pressure a considerable tangential force is already available at the crank pin.

Through this arrangement it is accomplished that maximum combustion pressure, in case of lacking, or defective, or insufficient control of the combustion chamber, even at unfavorable operating conditions, is never reached before zero position of the crank circle, which means that no inadmissibly high combustion pressure can develop and that at the point of maximum combustion pressure a considerable tangential force is already available at the crank pin.

Furthermore, this novel form of the piston stroke is of advantage in so far as shortly before reaching maximum combustion pressure the piston speed is higher than in conventional engines, so that sealing losses between piston and cylinder sleeve and thermal losses of the compressed gas are kept low, a fact which is of great importance in any internal combustion engine of the self-ignition type.

There are many possibilities to utilize the tilting motion of the upper connecting rod end for an edditional piston stroke.

Fig. 2 shows an arrangement in which the upper connecting rod end 3 is bifurcated. One side of this fork is provided with a toothing 4 which may be designed either as a toothed rack or as a toothed segment having a comparatively large pitch diameter. The other side of the fork is provided with a guide lug 5, shaped as a gliding surface and resting against a guide 6 inserted in the piston. The toothing 4 is engaged by a counter toothing 8 secured in the piston, the teeth of which being also designed as a toothed rack or as a toothed segment with a comparatively large pitch diameter.

Presuming that the crank shaft rotates in clock-wise direction, the connecting rod 3 during the last part of its travel to the top dead center of the piston 7 tilts from an angular position directed to the left into a vertical position. The connecting rod toothing 4 moves on the piston toothing 8, whereby the piston is displaced upwards for a certain distance relative to the connecting rod end. Upon further rotation of the crank pin beyond zero position of the crank shaft the connecting rod tilts to the right in an angular motion, whereby the piston moves further upwards until the maximum angular position of the connecting rod has been reached. From here, the piston is gradually retracted into its initial position. Through this arrangement it is achieved that the top dead center of the piston bottom is displaced in the direction of rotation relative to zero position of the crank circle.

The counter toothing 8 and the guide 6 in the piston preferably are made of a special hard material and secured in the piston. Said parts may be arranged rotatably in the piston for easy assembly and adjustment.

In this arrangement the piston body 7 is of simple structure. The piston 7 is mounted to the connecting rod 3 in that at first the counter toothing 8 and the guide 6 are inserted into the piston body from inside. By tilting the piston 7, the teeth can engage the guide lug 5 of the connecting rod 3 contacting the guide 6. The toothed rack illustrates only one of various possible embodiments. In another suitable arrangement curved planes are provided inside the piston, on which sliding surfaces particularly arranged at the upper connecting rod end or interposed rollers glide or roll.

Fig. 3 shows a connecting rod 3 which on one side is provided with a roller 9, securely but rotatably journalled in the connecting rod head. On the other side of the connecting rod 3 a curved plane 10 has been arranged on which glides or rolls another movable roller 11. Inside the piston 7, for instance, a member 13 is fixed by a screw 12, which member is provided with a curve-like recess 14 on its one side which is engaged by the roller 9, and the opening of which is greater for an amount necessary for the desired additional piston stroke. On the other side the roller 11 is supported on a curved section 15. If the crank pin moves towards the top dead center the roller 11 contacts the upper part of the curved places 10 and 15 which are shaped and arranged so that the space between them increases at first. Upon further tilting of the connecting rod the roller 11 rolls or slides downwards as illustrated in Fig. 4. The roller 9 rests against the upper part of the curved surface 14 so that an additional movement is imparted to the piston. Upon further tilting of the connecting rod this additional stroke of the piston is further continued, whereby the roller 11 rolls or slides further downwards. Only when the movement of the connecting rod is reversed, the additional stroke of the piston 7 is also revoked again.

Fig. 5 shows an arrangement in which two rollers 9 and 11 are journalled securely but rotatably in the upper part of the connecting rod 3. The roller 11 rests on the upper part of the curved plane 16, the roller 9 on the lower part of the curved plane 17. If the crank pin 18 approaches zero position the roller 11 rolls or slides downward on the curved plane 16, and the roller 9 moves upwards from the lower part of the curved plane 17. This results in an additional stroke of the piston.

In Fig. 6 a position of the crank pin 18 is illustrated which is beyond zero. Since the curved plane 16 in its lower part approaches the piston axis, the piston 7 through means of the roller 9 has been lifted a certain amount relative to the connecting rod end. The lower opening of the inserted member formed by the curved surfaces has been designed so that the roller movement in the embodiments according to Fig. 3 to 6, in the positions of the connecting rod possible during operation, is limited by lugs 19 and 20. The opening between both lugs, however, is of a width to enable the piston to be mounted to the connecting rod head by tilting the piston.

I claim:

1. An internal combustion engine comprising, a cylinder, a piston operating in said cylinder, a connecting rod, and means on the upper end of the connecting rod interposed between the piston and the connecting rod and adapted to contact and co-act with an internal surface within the piston for imparting an additional stroke to said piston in the zone of its top dead center, said means and said internal surface constituting the sole connection between the piston and connecting rod and said means being formed of a toothing arranged at the end of said connecting rod, and a further toothing in said piston which engages in said toothing on said connecting rod.

2. An internal combustion engine comprising, a cylinder, a piston operating in said cylinder, a connecting rod, and means on the upper end of the connecting rod interposed between the piston and the connecting rod and adapted to contact and co-act with an internal surface within the piston for imparting an additional stroke to said piston in the zone of its top dead center, said means and said internal surface constituting the sole connection between the piston and connecting rod and said means comprising teeth at the end of said connecting rod and an inserted member having corresponding teeth and being fixed in said piston.

3. An internal combustion engine comprising, a cylinder, a piston operating in said cylinder, a connecting rod, and means on the upper end of the connecting rod interposed between the piston and the connecting rod and adapted to contact and co-act with an internal surface within the piston for imparting an additional stroke to said piston in the zone of its top dead center, said means and said internal surface constituting the sole connection between the piston and connecting rod and said means comprising teeth at the end of said connecting rod and an inserted member having corresponding teeth and being fixed in said piston, said inserted member forming a cylindrical body rotatable about an axis transverse to the longitudinal axis of said piston.

4. An internal combustion engine comprising, a cylinder, a piston operating in said cylinder, a connecting rod, and means on the upper end of the connecting rod interposed between the piston and the connecting rod and adapted to contact and co-act with an internal surface within the piston for imparting an additional stroke to said piston in the zone of its top dead center, said means and said internal surface constituting the sole connection between the piston and connecting rod and said means being formed of a toothing arranged at the end of said connecting rod, and a further toothing in said piston which engages in said toothing on said connecting rod, a guide surface on the end of said connecting rod provided with said toothing, and an additional gliding plane inside said piston on which said guide surface of said connecting rod is supported.

5. An internal combustion engine comprising, a cylinder, a piston operating in said cylinder, a connecting rod, and means on the upper end of the connecting rod interposed between the piston and the connecting rod and adapted to contact and co-act with an internal surface within the piston for imparting an additional stroke to said piston in the zone of its top dead center, said means and said internal surface constituting the sole connection between the piston and connecting rod and said means being formed of a toothing arranged at the end of said connecting rod, and a further toothing in said piston which engages in said toothing on said connecting rod, a guide surface on the end of said connecting rod provided with said toothing, and an additional gliding plane inside said piston on which said guide surface of said connecting rod is supported, said piston forming a separate inserted member.

References Cited in the file of this patent

UNITED STATES PATENTS

| | | |
|---|---|---|
| 669,416 | Johnson | Mar. 5, 1901 |
| 727,777 | Foster | May 12, 1903 |
| 1,379,115 | Mallory | May 24, 1921 |
| 1,420,236 | Bohman | June 20, 1922 |
| 1,431,617 | Young | Oct. 10, 1922 |
| 2,574,934 | Perry | Nov. 13, 1951 |

FOREIGN PATENTS

| | | |
|---|---|---|
| 25,470 | Great Britain | 1910 |
| 259,517 | Italy | July 5, 1928 |
| 536,393 | Germany | Oct. 22, 1931 |
| 809,912 | France | Dec. 19, 1936 |
| 993,044 | France | July 18, 1951 |